(12) United States Patent
Yakumaru et al.

(10) Patent No.: US 8,590,326 B2
(45) Date of Patent: Nov. 26, 2013

(54) REFRIGERATION CYCLE APPARATUS

(75) Inventors: Yuichi Yakumaru, Osaka (JP); Katsuji Taniguchi, Osaka (JP); Masaya Honma, Osaka (JP)

(73) Assignee: Panasonic Corporation, Osaka (JP)

( * ) Notice: Subject to any disclaimer, the term of this patent is extended or adjusted under 35 U.S.C. 154(b) by 836 days.

(21) Appl. No.: 12/680,780

(22) PCT Filed: Oct. 8, 2008

(86) PCT No.: PCT/JP2008/002846
§ 371 (c)(1),
(2), (4) Date: Mar. 30, 2010

(87) PCT Pub. No.: WO2009/047898
PCT Pub. Date: Apr. 16, 2009

(65) Prior Publication Data
US 2010/0218528 A1 Sep. 2, 2010

(30) Foreign Application Priority Data

Oct. 9, 2007 (JP) ................................. 2007-263081

(51) Int. Cl.
F25D 21/06 (2006.01)
F25D 21/00 (2006.01)
F25B 49/00 (2006.01)
F25B 1/00 (2006.01)

(52) U.S. Cl.
USPC .................. 62/156; 62/80; 62/151; 62/228.1; 62/228.4; 62/510

(58) Field of Classification Search
USPC ............. 62/80, 128, 140, 151, 156, 234, 215, 62/226, 227, 228.1, 228.4, 228.5, 510
See application file for complete search history.

(56) References Cited

U.S. PATENT DOCUMENTS

| 2,494,120 | A | * | 1/1950 | Ferro, Jr. ............................ | 62/87 |
| 2,519,010 | A | * | 8/1950 | Zearfoss, Jr. .................... | 62/116 |
| 2,737,031 | A | * | 3/1956 | Wulle ................................ | 62/87 |
| 3,277,658 | A | * | 10/1966 | Leonard, Jr. ....................... | 62/87 |
| 3,932,159 | A | * | 1/1976 | Goldsberry ....................... | 62/510 |
| 3,986,852 | A | * | 10/1976 | Doerner et al. ................... | 62/467 |

(Continued)

FOREIGN PATENT DOCUMENTS

| EP | 1 484 559 | 12/2004 |
| EP | 1 860 389 | 11/2007 |

(Continued)

*Primary Examiner* — Frantz Jules
*Assistant Examiner* — Henry Crenshaw
(74) *Attorney, Agent, or Firm* — Hamre, Schumann, Mueller & Larson, P.C.

(57) ABSTRACT

A refrigeration cycle apparatus 100 includes a first compressor 101, a second compressor 102 provided in parallel with the first compressor 101, a radiator 103 for cooling a refrigerant compressed by the compressors 101 and 102, an expander 104 for recovering power while expanding the refrigerant cooled by the radiator 103, an evaporator 105 for evaporating the refrigerant expanded by the expander 104, a rotation shaft 123 connecting the first compressor 101 to the expander 104 so that the first compressor 101 uses the power recovered by the expander 104, a controller 112 for executing a control including a step of increasing a flow rate of the refrigerant gradually during a defrosting operation in which frost formed on the evaporator 105 is melted by allowing the refrigerant having a high temperature to flow through the evaporator 105.

7 Claims, 8 Drawing Sheets

(56) References Cited

U.S. PATENT DOCUMENTS

| | | | |
|---|---|---|---|
| 4,246,759 A * | 1/1981 | Signoret | 62/77 |
| 4,896,515 A * | 1/1990 | Endou | 62/498 |
| 4,923,492 A * | 5/1990 | Hewitt | 62/619 |
| 5,428,966 A * | 7/1995 | Alsenz | 62/116 |
| 5,467,613 A * | 11/1995 | Brasz | 62/402 |
| 7,762,099 B2 * | 7/2010 | Okamoto et al. | 62/402 |
| 2002/0139132 A1 * | 10/2002 | Collins | 62/156 |
| 2003/0101738 A1 * | 6/2003 | Yim | 62/156 |
| 2006/0059929 A1 | 3/2006 | Sakitani et al. | |
| 2007/0101735 A1 * | 5/2007 | Matsui et al. | 62/160 |

FOREIGN PATENT DOCUMENTS

| | | | |
|---|---|---|---|
| JP | 4-340062 | | 11/1992 |
| JP | 04340062 | * | 11/1992 |
| JP | 2001-116371 A | | 4/2001 |
| JP | 2002-081714 | * | 3/2002 |
| JP | 2002-081714 A | | 3/2002 |
| JP | 2004-212006 A | | 7/2004 |
| JP | 2005-147610 A | | 6/2005 |
| JP | 2006-242491 A | | 9/2006 |

* cited by examiner

US 8,590,326 B2

REFRIGERATION CYCLE APPARATUS

TECHNICAL FIELD

The present invention relates to a refrigeration cycle apparatus. Particularly, the present invention relates to a defrosting operation of a refrigeration cycle apparatus having an expander for recovering power from a refrigerant.

BACKGROUND ART

As shown in FIG. 9, there has been known a refrigeration cycle apparatus (JP 2001-116371 A) that is intended to improve COP (coefficient of performance) by connecting an expander 4 to a compressor 3 with a shaft so as to utilize the power obtained by the expander 4 for driving the compressor 3. Since the expander and the compressor are connected to each other with the shaft in this refrigeration cycle apparatus, the ratio of density $\rho_e$ of the refrigerant at an inlet of the expander to density $\rho_c$ of the refrigerant at an inlet of the compressor, which is $\rho_e/\rho_c$, always is constant (constraint of constant density ratio). Accordingly, the COP is poor under operational conditions straying from ideal design conditions.

Facing this problem, there has been proposed a refrigeration cycle apparatus (JP 2004-212006 A) having an expander 23, a first compressor 21, and a second compressor 22 as shown in FIG. 10. The first compressor 21 and the expander 23 are connected to each other with a shaft, and the second compressor 22 is provided in parallel with the first compressor 21. In this refrigeration cycle apparatus, it is possible to avoid the constraint of constant density ratio by controlling a rotation speed of the second compressor 22. As a result, the COP can be kept high all the time.

A defrosting operation can be mentioned as one of the operation modes essential for refrigeration cycle apparatuses. When the outside air temperature is closer to 0° C., frost starts to form on an evaporator, lowering extremely the efficiency of the heat exchange at the evaporator. Thus, a high temperature refrigerant is made to flow through the evaporator to melt the frost. A cycle of this defrosting operation (hereinafter also referred to as a defrosting cycle) is as follows.

FIG. 11 is a Mollier diagram of refrigeration cycle apparatuses (FIG. 9 and FIG. 10) in which power is recovered by an expander during the defrosting operation. The refrigerant is compressed by a compressor from Point a1 to Point b1 and flows into a radiator. When the radiator is a water-refrigerant heat exchanger, the flow rate of water flowing into the radiator is zero, and thus the refrigerant flows into the expander almost without a change in enthalpy from Point b1. Thereafter, the refrigerant is decompressed by the expander and moves to an inlet (Point c1) of the evaporator. Since power is recovered at the expander, the enthalpy of the refrigerant at Point c1 is lower than that of the refrigerant at Point b1. The refrigerant that has flowed into the evaporator melts the frost by heating the evaporator, and then returns to an inlet (Point a1) of the compressor.

Next, FIG. 12 shows a Mollier diagram of a conventional refrigeration cycle apparatus using an expansion valve, during the defrosting operation. The refrigerant is compressed by a compressor from Point a2 to Point b2 and flows into a radiator. The refrigerant that has flowed into the expansion valve at Point b2 is decompressed without a change in enthalpy, and moves to an inlet (Point c2) of an evaporator. The refrigerant that has flowed into the evaporator melts the frost by heating the evaporator, and then returns to an inlet (Point a2) of the compressor.

In each of the defrosting cycles shown in FIG. 11 and FIG. 12, the amount of the heat that the evaporator obtains is equal to the difference between the enthalpy of the refrigerant at the inlet of the evaporator and the enthalpy of the refrigerant at the outlet of the evaporator. Since the power is recovered also during the defrosting operation, the enthalpy difference $\Delta h1$ in the defrosting cycle using the expander is smaller than the enthalpy difference $\Delta h2$ in the defrosting cycle using the expansion valve. Thus, the defrosting cycle using the expander needs a longer defrosting time than that of the defrosting cycle using the expansion valve.

DISCLOSURE OF THE INVENTION

In view of the foregoing, the present invention is intended to shorten a defrosting time of a defrosting cycle using an expander.

More specifically, the present invention provides a refrigeration cycle apparatus including:

a positive displacement first compressor;

a positive displacement second compressor whose rotation speed can be controlled independently from a rotation speed of the first compressor, the positive displacement second compressor being provided in parallel with the first compressor in a refrigerant circuit;

a radiator for cooling a refrigerant compressed by the first and second compressors;

a positive displacement expander for recovering power while expanding the refrigerant cooled by the radiator;

an evaporator for evaporating the refrigerant expanded by the expander;

a rotation shaft connecting the first compressor to the expander so that the first compressor uses the power recovered by the expander; and a controller for executing a control including a step of increasing a total of a flow rate of the refrigerant at an outlet of the first compressor and a flow rate of the refrigerant at an outlet of the second compressor during a defrosting operation in which frost formed on the evaporator is melted by allowing the refrigerant having a high temperature to flow through the evaporator. The total of the flow rates is increased in accordance with melting of the frost.

Ignoring an increase in power consumption, the defrosting time is considered to become shorter by increasing the rotation speed of the compressor to maximum to increase the flow rate of the refrigerant. In the refrigeration cycle apparatus shown in FIG. 10, for example, the first compressor 21 and the second compressor 22 each are driven at a design maximum rotation speed (70 Hz, for example) during the defrosting operation. Since the rotation speed of the expander 23 increases along with that of the first compressor 21, the flow rate (circulation amount) of the refrigerant in a refrigerant circuit increases certainly, although the density of the refrigerant at an inlet of the expander 23 does not increase in proportion to the rotation speed. Accordingly, the defrosting time is shortened. Actually, in a conventional refrigeration cycle apparatus using an expansion valve, the rotation speed of a compressor usually is kept at a maximum rotation speed during the defrosting operation.

However, when the first compressor and the second compressor each are driven at a maximum rotation speed, the defrosting time fails to be the shortest, although the flow rate of the refrigerant becomes maximum. This is because the length of the defrosting time relates not only to the flow rate of the refrigerant but also to an amount of heat that the refrigerant releases to the evaporator. Specifically, in the Mollier diagram shown in FIG. 11, a defrosting cycle with a large enthalpy difference Δh1 and a high flow rate is most ideal and can shorten the defrosting time most. In order to operate in the ideal defrosting cycle with a large enthalpy difference Δh1, the difference between the high pressure and the low pressure in the defrosting cycle should be decreased, in other words, the rotation speed of the compressor should be decreased appropriately. However, when the rotation speed of the compressor is decreased, the flow rate of the refrigerant also is decreased, extending the defrosting time. In short, the flow rate of the refrigerant and the amount of the heat that the refrigerant gives to the evaporator are in a trade-off relationship in a sense.

Consequently, it seems appropriate to find a defrosting cycle in which the flow rate of the refrigerant is balanced with the amount of the heat that the refrigerant gives to the evaporator and perform the defrosting operation with this defrosting cycle. Inconveniently, however, the state of the refrigeration cycle apparatus varies in accordance with melting of the frost, and the ideal defrosting cycle shifts to a high pressure-high enthalpy side. Thus, in order to perform an efficient defrosting operation, it is necessary to take into consideration the variation in the state of the refrigeration cycle apparatus over time.

Based on such knowledge, the present inventors pursued intensive studies. As a result, they arrived at the fact that in the defrosting operation, it is possible to make the defrosting time shorter by increasing the total of the flow rate of the refrigerant at the outlet of the first compressor and the flow rate of the refrigerant at the outlet of the second compressor in accordance with melting of the frost than by keeping the rotation speeds of the first and second compressors each at a maximum rotation speed.

The main concept of the present invention is as follows. First, in the early stage of the defrosting operation, the defrosting operation is performed in a cycle in which the difference between the pressure of the refrigerant at the inlet of the compressor (the pressure at Point a1 in FIG. 11) and the pressure of the refrigerant at the inlet of the expander (the pressure at Point b1 in FIG. 11) is as small as possible and the enthalpy difference Δh1 is large. As the defrosting proceeds, the flow rate of the refrigerant is increased so as to cope with the variation in the state of the refrigeration cycle apparatus over time.

When thus configured, it is possible to perform the defrosting operation in an effective cycle from the beginning to the end of the defrosting operation, and finish the defrosting operation in a shorter time than when the rotation speeds of the first and second compressors each is kept at a maximum rotation speed from the beginning to end of the defrosting operation. In addition, power consumption also can be reduced.

BEST MODE FOR CARRYING OUT THE INVENTION

An embodiment of the refrigeration cycle apparatus of the present invention will be described with reference to the drawings.

Figure 1:
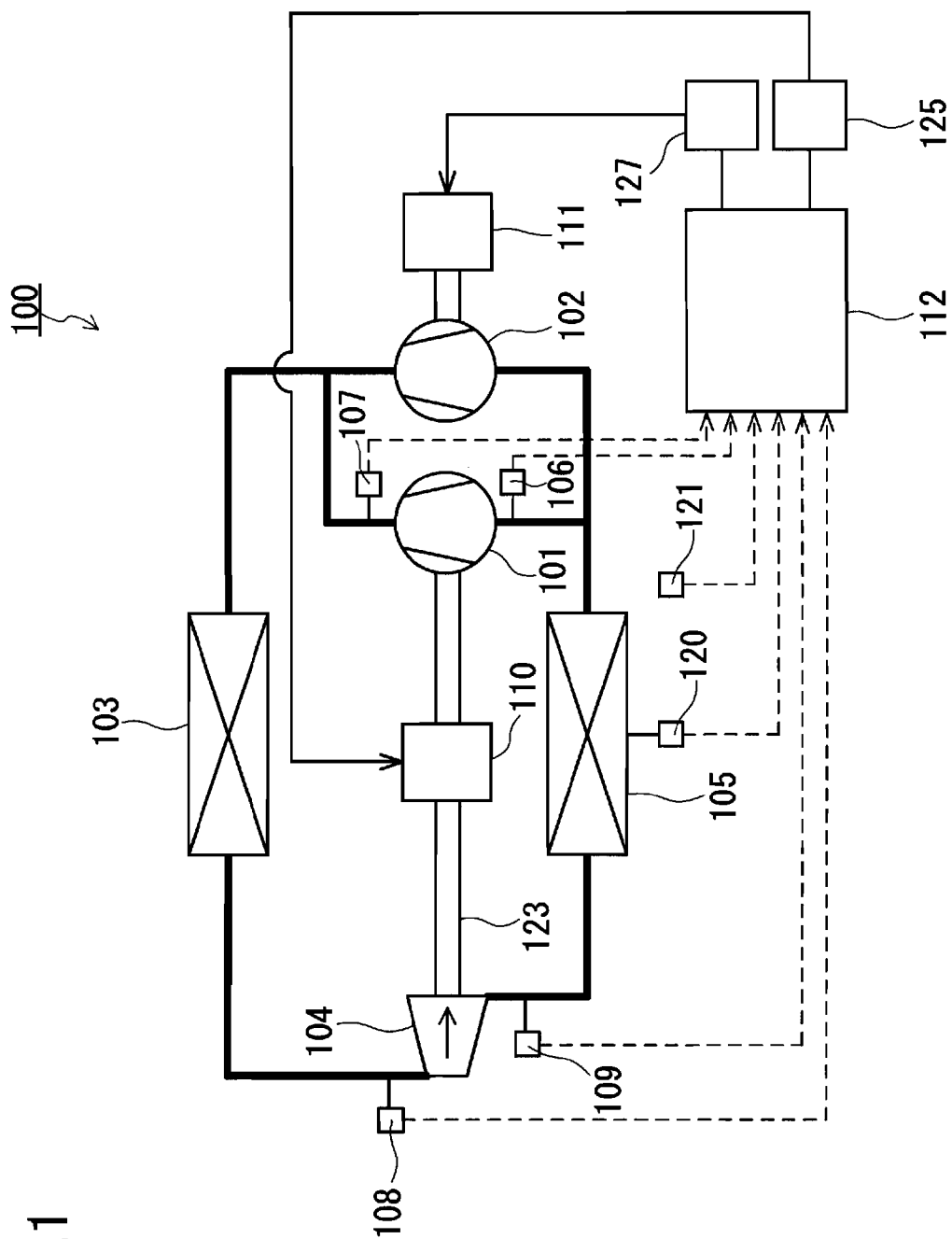
FIG. 1 is a configuration diagram of a refrigeration cycle apparatus according to an embodiment of the present invention.

As shown in FIG. 1, a refrigeration cycle apparatus 100 of the present embodiment includes a first compressor 101 for compressing a refrigerant, a second compressor 102 provided in parallel with the first compressor 101 in a refrigerant circuit, a radiator 103 for cooling the refrigerant compressed by the first compressor 101 and the second compressor 102, an expander 104 for decompressing and expanding the refrigerant, and an evaporator 105 for heating the refrigerant expanded by the expander 104. These devices are connected by a pipe so as to form the refrigerant circuit. The refrigerant circuit branches off on a downstream side of the evaporator 105 so that the refrigerant is guided to each of the first compressor 101 and the second compressor 102. The branches of the refrigerant circuit are merged with each other on an upstream side of the radiator 103 so that the total amount of the compressed refrigerant flows into the radiator 103. The refrigerant circuit is filled with the refrigerant, such as carbon dioxide and hydrofluorocarbon.

In the case where the refrigeration cycle apparatus 100 is applied to a water heater, for example, the radiator 103 is a water-refrigerant heat exchanger and the evaporator 105 is a fin tube heat exchanger. In the case where the refrigeration cycle apparatus 100 is applied to an air conditioner, both of the radiator 103 and the evaporator 105 are fin tube heat exchangers.

Each of the first compressor 101, the second compressor 102, and the expander 104 is composed of a positive displacement fluid machine of scroll type, rotary type, reciprocating type, or the like. The expander 104 recovers the energy released from the refrigerant during expansion in the form of power. The first compressor 101 and the expander 104 are connected to each other with a rotation shaft 123 so that the first compressor 101 uses the power recovered by the expander 104. A motor 110 for driving the rotation shaft 123 is disposed between the first compressor 101 and the expander 104. In the present embodiment, a rotation speed of the first compressor 101 always is equal to that of the expander 104 because they are coupled to each other with the rotation shaft 123. On the other hand, a dedicated motor 111 is connected to the second compressor 102. A rotation speed of the motor 110 can be controlled separately from that of the motor 111. In other words, the rotation speed of the first compressor 101 can be controlled independently from that of the second compressor 102. Thereby, the constraint of constant density ratio can be avoided.

The first compressor 101, the motor 110, the rotation shaft 123, and the expander 104 are accommodated in a common closed casing (not shown). This type of fluid machine is disclosed in WO 2006/035934, for example. Likewise, the second compressor 102 and the motor 111 also are accommodated in a common closed casing (not shown).

The refrigeration cycle apparatus 100 further includes a controller 112 as a means to control the operation, a first inverter 125 for feeding electric power to the motor 110, and a second inverter 127 for feeding electric power to the motor 111. Specifically, a DSP (Digital Signal Processor) including an A/D conversion circuit, an input/output circuit, an arithmetic and logic unit, a memory, etc. is used as the controller 112. The controller 112 controls the rotation speeds of the motors 110 and 111, more specifically, the rotation speeds of the first compressor 101 and the second compressor 102 by controlling the inverters 125 and 127.

The refrigerant circuit is provided with a first temperature sensor 106 for detecting a temperature of the refrigerant at an inlet of the first compressor 101, a second temperature sensor 107 for detecting a temperature of the refrigerant at an outlet of the first compressor 101, a third temperature sensor 108 for detecting a temperature of the refrigerant at an inlet of the expander 104, a fourth temperature sensor 109 for detecting a temperature of the refrigerant at an outlet of the expander 104, a frost formation temperature sensor 120 for detecting a surface temperature of a heat-transfer pipe in the evaporator 105, and an outside air temperature sensor 121 for detecting an outside air temperature around the evaporator 105. Temperature detecting elements, such as a thermistor and a thermocouple, can be used for these temperature sensors. Signals from each of the temperature sensors are inputted to the controller 112.

Although the first compressor 101 may have a design displacement different from that of the second compressor 102, it is advantageous when they are equal. This is because the cost can be reduced by using the same fluid machines for the first compressor 101 and the second compressor 102. The "displacement" means a containment volume at the time when the drawing of the refrigerant is completed.

It is possible to provide a circuit for bypassing the expander 104, and a pre-expansion valve between the radiator 103 and the expander 104 (not shown).

Next, the defrosting operation of the refrigeration cycle apparatus 100 will be described.

In the present embodiment, the "defrosting operation" means an unsteady operation for melting the frost and ice formed on the evaporator 105 by allowing the expander 104 to decompress the refrigerant compressed by the first compressor 101 and the second compressor 102 substantially without cooling the refrigerant, and then allowing the refrigerant to flow through the evaporator 105. Specifically, stopping a water pump in a water heater or a fan in an air conditioner, which turns the amount of the water or air flowing into the radiator 103 into zero, allows the refrigerant to flow into the expander 104 substantially without being cooled.

It is possible to adopt a hot-gas-bypassing method in which the refrigerant flows into a circuit bypassing the radiator 103, or a four-way valve switching method in which a four-way valve provided in the refrigerant circuit allows the refrigerant to flow backward.

Figure 2:
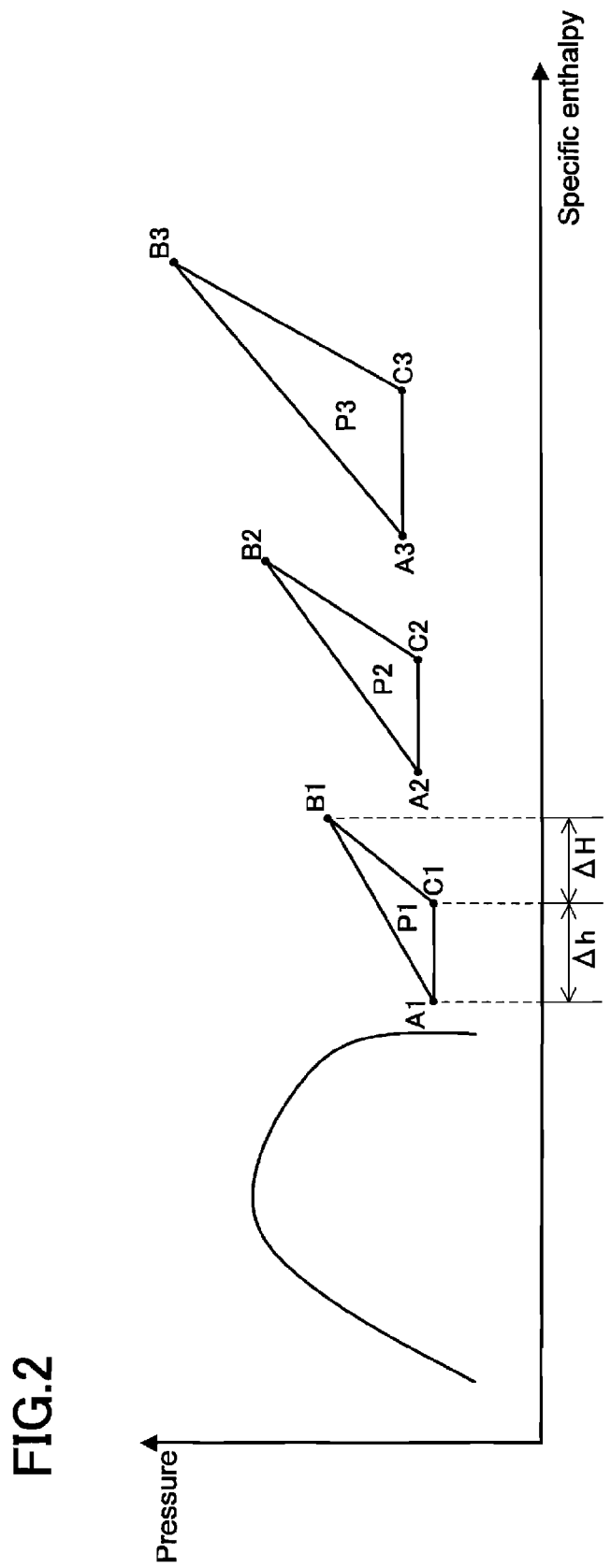
FIG. 2 is a Mollier diagram of the refrigeration cycle apparatus shown in FIG. 1 during a defrosting operation.

FIG. 2 is a Mollier diagram of the refrigeration cycle apparatus of the present invention during the defrosting operation.

The three cycles (defrosting cycles) shown in FIG. 2 illustrate schematically Cycle P1 at the time of starting the defrosting operation, Cycle P2 in the middle of the defrosting operation, and Cycle P3 at the time of ending the defrosting operation, respectively.

Referring to Cycle P1 at the time of starting the defrosting operation as an example, the refrigerant is compressed by the compressors 101 and 102 from Point A1 to Point B1 and flows into the radiator 103. Since no heat exchange occurs in the radiator 103, Point B1 corresponds to the state of the refrigerant at the inlet of the expander 104. The refrigerant is decompressed by the expander 104 and moves to an inlet (Point C1) of the evaporator 105. Enthalpy difference ΔH between Point B1 and Point C1 corresponds to the power recovered by the expander 104. The refrigerant that has flowed into the evaporator 105 melts the frost by heating the evaporator 105, and then returns to the inlets (Point A1) of the compressors 101 and 102. Enthalpy difference Δh between Point C1 and Point A1 corresponds to an amount of the heat given to the evaporator 105. These descriptions are applicable also to Cycle P2 in the middle of the defrosting operation and Cycle P3 at the time of ending the defrosting operation.

In the present embodiment, during the defrosting operation, the total of the flow rate of the refrigerant at the outlet of the first compressor 101 and the flow rate of the refrigerant at the outlet of the second compressor 102 is increased gradually in accordance with melting of the frost. As the defrosting operation proceeds, the temperature of the refrigerant at each part of the refrigeration cycle apparatus 100 rises. Along with this, the cycle shifts rightward in the Mollier diagram and both of the high pressure and the low pressure of the cycle rise (P1→P2→P3). The ratio of density $\rho_e$ of the refrigerant at the inlet of the expander 104 to density $\rho_c$ of the refrigerant at the inlets of the compressors 101 and 102, which is $\rho_e/\rho_c$, is increased gradually. With respect to Cycles P1, P2, and P3, a relationship of $(\rho_{B1}/\rho_{A1})<(\rho_{B2}/\rho_{A2})<(\rho_{B3}/\rho_{A3})$ holds, where $\rho_{A1}$, $\rho_{A2}$, and $\rho_{A3}$ denote the densities of the refrigerant at the inlets of the compressors 101 and 102, and $\rho_{B1}$, $\rho_{B2}$, and $\rho_{B3}$ denote the densities of the refrigerant at the inlet of the expander.

If the compressors 101 and 102 are driven at maximum rotation speeds from immediately after the start to the end of the defrosting operation, the density ratio of the refrigerant cannot be changed. Thus, shortage of the flow rate of the refrigerant to be displaced by the expander 104 gradually becomes noticeable, and the refrigeration cycle apparatus forcedly is operated in a cycle straying significantly from the ideal cycle. In contrast, in the present embodiment, it is possible to eliminate or compensate for the shortage of the flow rate of the refrigerant to be displaced by the expander 104 by increasing gradually the total of the flow rate of the refrigerant at the outlet of the first compressor 101 and the flow rate of the refrigerant at the outlet of the second compressor 102.

In order to increase gradually the total of the flow rate of the refrigerant at the outlet of the first compressor 101 and the flow rate of the refrigerant at the outlet of the second compressor 102, the following control is executed in the present embodiment.

Increase gradually the rotation speed of the first compressor 101 after the defrosting operation is started (Pattern A).

Increase gradually the rotation speed of the second compressor 102 after the defrosting operation is started (Pattern B).

In this description, the phrase "increase a flow rate gradually" means that the flow rate may be increased continuously or stepwise. Likewise, "increase a rotation speed gradually" means that the rotation speed may be increased continuously or stepwise.

Figure 3:
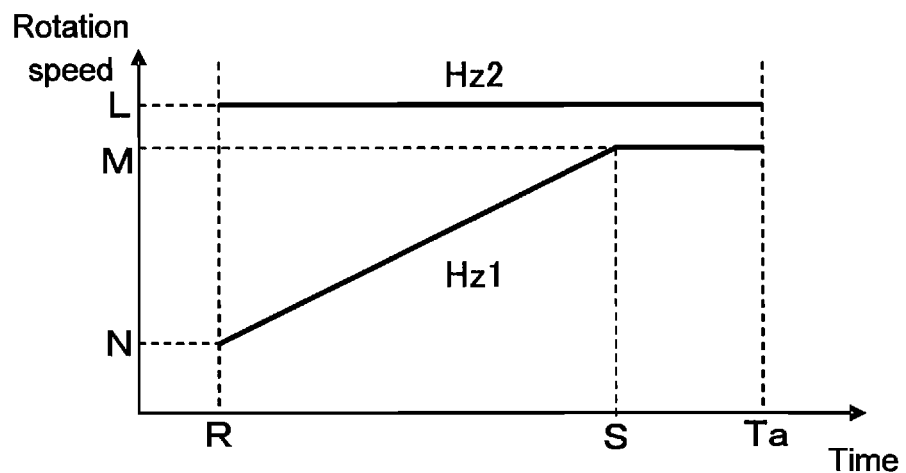
FIG. 3 is a time chart (Pattern A) showing controls of rotation speeds of a first compressor and a second compressor during the defrosting operation.
Figure 4:
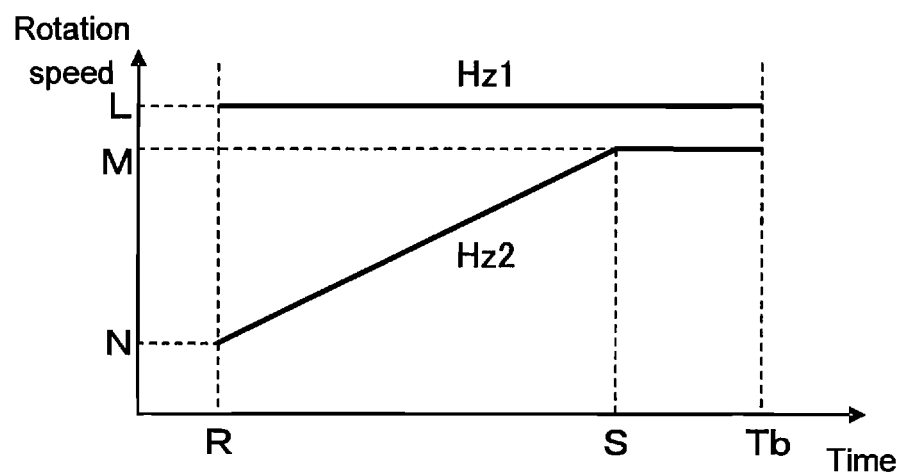
FIG. 4 is a time chart (Pattern B) showing controls of the rotation speeds of the first compressor and the second compressor during the defrosting operation.
Figure 5:
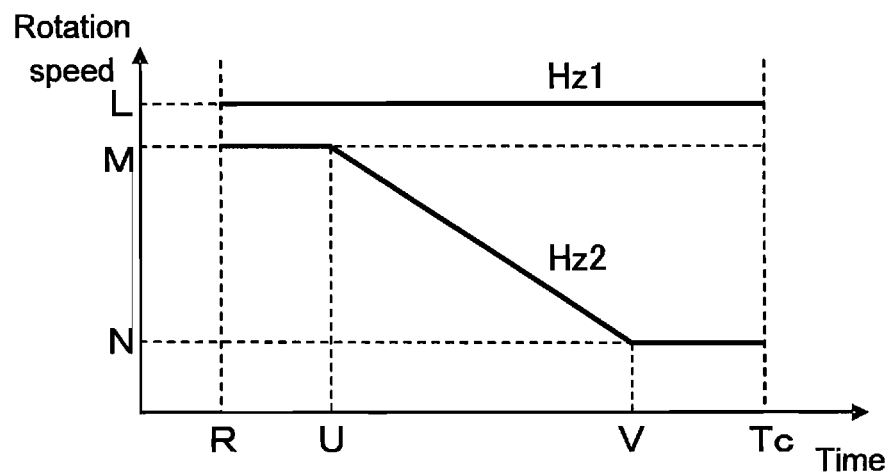
FIG. 5 is a time chart (Pattern C) showing controls of the rotation speeds of the first compressor and the second compressor during the defrosting operation.
Figure 6:
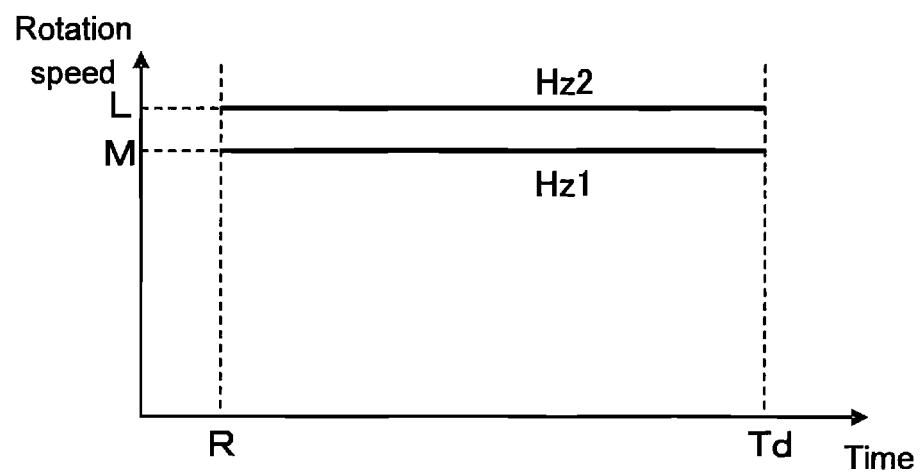
FIG. 6 is a time chart (Pattern D) showing controls of the rotation speeds of the first compressor and the second compressor during the defrosting operation.

FIG. 3 shows Pattern A in which the rotation speed of the first compressor 101 is increased gradually. FIG. 4 shows Pattern B in which the rotation speed of the second compressor 102 is increased gradually. As comparative examples, FIG. 5 shows Pattern C in which the rotation speed of the second compressor 102 is decreased gradually, and FIG. 6 shows Pattern D in which the rotation speeds of the compressors 101 and 102 are maximum from the start to the end of the defrosting operation.

In FIG. 3 to FIG. 6, Time R denotes the time at which the defrosting is started, Time S and Time V denote the times at which the rotation speed of the first compressor 101 or the rotation speed of the second compressor 102 becomes constant, Times Ta to Td denote the times at which the defrosting is ended, and Time U denotes the time at which the rotation speed of the second compressor 102 starts decreasing. Hz1 denotes the rotation speed of the first compressor 101, and Hz2 denotes the rotation speed of the second compressor 102. Rotation speed L denotes the design maximum rotation speed of each of the first compressor 101 and the second compressor 102. The rotation speed L is 70 Hz to 90 Hz, for example. Rotation speed M denotes a rated rotation speed of each of the first compressor 101 and the second compressor 102, or a rotation speed near the rated rotation speed. The rotation speed M is 50 Hz to 70 Hz, for example. Rotation speed N is a rotation speed lower than the rated rotation speed, and it is 20 Hz to 50 Hz, for example. Since there is a case where the second compressor 102 is stopped and only the first compressor 101 is operated immediately before the defrosting operation is started, the rotation speed N may be zero. The values of L, M, and N are determined in accordance with the specifications, applications, and use environment of the refrigeration cycle apparatus and are not limited to the above-mentioned ranges.

In Pattern A, the rotation speed of the first compressor 101 can be increased at a rate of 2 Hz/min to 20 Hz/min (or 4 Hz/min to 15 Hz/min), for example. Likewise, in Pattern B, the rotation speed of the second compressor 102 can be increased at a rate of 2 Hz/min to 20 Hz/min (or 4 Hz/min to 15 Hz/min.) By accelerating the compressor slowly at a rate of this level, it is possible to shorten certainly the defrosting time and reduce the power consumption. From another viewpoint, a control can be executed so that the temperature of the refrigerant at an outlet of the evaporator 105 is increased at a rate of 2° C./min to 4° C./min.

The acceleration of the compressor may be continued from the start to the end of the defrosting operation by predicting the defrosting time, or the acceleration may be stopped on the way. That is, it is possible to increase the rotation speed at a somewhat low rate until reaching a predetermined rotation speed, and then maintain this predetermined rotation speed until the defrosting operation is ended. For example, in Pattern A, the first compressor 101 is accelerated from Time R (the start of the defrosting) to Time S, and the rotation speed of the first compressor 101 is kept at M from Time S to Time Ta (the end of the defrosting). Likewise, in Pattern B, the second compressor 102 is accelerated from Time R (the start of the defrosting) to Time S, and the rotation speed of the second compressor 102 is kept at M from Time S to Time Tb (the end of the defrosting). Furthermore, the rotation speeds of the compressors 101 and 102 may be increased monotonically (continuously) or stepwise.

The refrigeration cycle apparatus (for a water heater) shown in FIG. 1 was produced and subject to the defrosting operation in each of the patterns, and measured for the time (defrosting time) and power consumption needed for defrosting. First, the evaporator 105 was placed in an environment at a temperature of 2° C., and the refrigeration cycle apparatus was operated at a rated rotation speed (60 Hz for the first compressor 101 and 60 Hz for the second compressor). Then, the defrosting operation was started 30 minutes after the surface temperature of the heat-transfer pipe provided in the evaporator 105 became −6° C. The point of time when the temperature of the refrigerant at the outlet of the evaporator 105 reached 10° C. was defined as the end of the defrosting.

The specific configuration of the refrigeration cycle apparatus is as follows.

<<Configuration of the Refrigeration Cycle Apparatus>>
Heating capacity: 9 kw
First compressor: Scroll type
Second compressor: Scroll type
Expander: Rotary type
Radiator: Water-refrigerant heat exchanger (inflow of water was stopped during the defrosting operation.)
Evaporator: Fin tube heat exchanger
Refrigerant: Carbon dioxide Table 1 shows the results. In Table 1, "defrosting time" and "power consumption" each are indicated with a relative ratio when the value in Pattern B is taken as 100. Time (R), (S), (T), (U), and (V) correspond to the times shown in FIG. 3 to FIG. 6, respectively.

TABLE 1

|  |  | Pattern A | Pattern B | Pattern C | Pattern D |
|---|---|---|---|---|---|
| Rotation speed (L) | Hz | 72 | 72 | 72 | 72 |
| Rotation speed (M) | Hz | 66 | 66 | 66 | 66 |
| Rotation speed (N) | Hz | 36 | 36 | 36 | — |
| Time (R) | Second | 0 | 0 | 0 | 0 |
| Time (S) | Second | 450 | 450 | — | — |
| Time (T) | Second | 628 | 592 | 710 | 641 |
| Time (U) | Second | — | — | 120 | — |
| Time (V) | Second | — | — | 570 | — |
| Defrosting time | — | 106 | 100 | 120 | 108 |
| Power consumption | — | 107 | 100 | 118 | 121 |

As described with reference to FIG. 2, as the defrosting operation proceeds, the ratio of the density of the refrigerant at the inlet of the expander 104 to the density of the refrigerant at the inlet of the compressors 101 and 102 is increased. By making the rotation speed of one of the compressors as high as possible and increasing gradually the rotation speed of the other compressor, it is possible to perform an effective operation in response to the variation in the density ratio.

Pattern A is a control pattern in which the rotation speed of the second compressor 102 is kept at the maximum rotation speed L and the rotation speed of the first compressor 101 is increased gradually from the rotation speed N that is lower than the maximum rotation speed L after the defrosting operation is started. In Pattern A, because of the low rotation speed of the expander 104 at the time of starting the defrosting operation, the circulation amount of the refrigerant was reduced and the defrosting time became slightly longer. However, a certain effect was obtained also in Pattern A, although it was not so much as in Pattern B.

Pattern B is a control pattern in which the rotation speed of the first compressor 101 is kept at the maximum rotation speed L and the rotation speed of the second compressor 102 is increased gradually from the rotation speed N that is lower than the maximum rotation speed L after the defrosting operation is started. Pattern B ended the defrosting in a shortest time and required the lowest power consumption. Reasons for this may be as follows. (i) Since the difference between the high pressure and the low pressure in the cycle relatively was small at the time of starting the defrosting, the enthalpy that the refrigerant lost in the expander 104 was also small. Thereby, the amount of heat Δh for heating the evaporator 105 could be ensured sufficiently from the early stage of the defrosting. (ii) The rotation speed of the first compressor 101 was high from the starting of the defrosting, and the circulation amount of the refrigerant was able to be ensured sufficiently.

Pattern C is a control pattern in which the rotation speed of the first compressor 101 is kept at the maximum rotation speed L and the rotation speed of the second compressor 102 is decreased gradually. Pattern C required the longest defrosting time. This may be because the low pressure of the cycle at the time of starting the defrosting was too low.

Pattern D is a control pattern in which both of the rotation speed of the first compressor 101 and that of the second compressor 102 are kept at high rotation speeds. Pattern D required a longer defrosting time than those of the Patterns A and B, and also required the largest power consumption thereamong. This may be because the low pressure of the cycle at the time of starting the defrosting was too low, and Pattern D failed to cope with the variation in the state of the refrigeration cycle apparatus over time.

As a combination of Patterns A and B, there also can be considered a control pattern in which the rotation speeds of the first compressor 101 and the second compressor 102 are increased gradually after the defrosting operation is started. This control pattern also is effective as long as it can ensure the flow rate of the refrigerant sufficiently.

As described above, it is possible to shorten the defrosting time and reduce the power consumption when the flow rate of the refrigerant is increased gradually by increasing gradually the rotation speed of at least one selected from the first compressor 101 and the second compressor 102. Preferably, the flow rate of the refrigerant is increased gradually by keeping the rotation speed of the first compressor 101 at the maximum rotation speed L and increasing the rotation speed of the second compressor 102 gradually from the rotation speed N that is lower than the rated rotation speed of the second compressor 102.

Next, the control of Pattern B will be described further with reference to the control flow chart shown in FIG. 7. In Pattern B shown in FIG. 4, the rotation speed of the second compressor 102, which is Hz2, is represented by a function of time t, f(t)+N, where N denotes an initial rotation speed.

Figure 7:
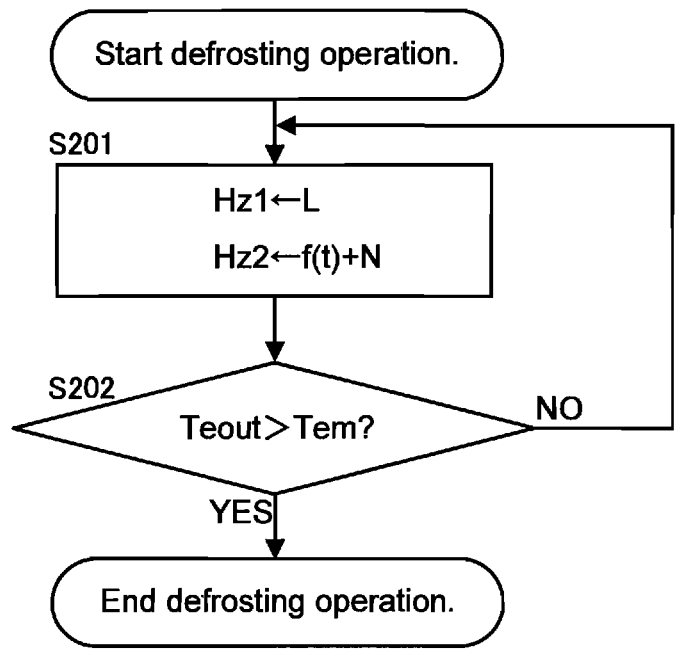
FIG. 7 is a control flow chart of the defrosting operation.

The controller 112 executes the control shown in FIG. 7 in response to the establishment of conditions for starting the defrosting operation. The conditions for starting the defrosting operation are not particularly limited. One example is that the defrosting operation is started when the outside air temperature is equal to or lower than a predetermined temperature and a predetermined time has passed since the surface temperature of the heat-transfer pipe provided in the evaporator 105 became equal to or lower than a predetermined temperature that requires the defrosting. For example, the defrosting operation is started when the temperature detected by the outside air temperature sensor 121 is 0° C. to 5° C. and the temperature detected by the frost formation temperature sensor 120 is −5° C. to −2° C. (or when a predetermined time has passed since then).

First, in Step 201, the rotation speed Hz1 of the first compressor 101 is set to L, and the rotation speed Hz2 of the second compressor 102 is set to f(t)+N. The maximum value of the rotation speed Hz2 of the second compressor 102 is denoted as M. L, M, and N are rotation speeds shown in FIG. 4, respectively. Subsequently, in Step 202, temperature Teout of the refrigerant at the outlet of the evaporator 105 is compared with preset value Tem (10° C., for example). If Teout>Tem, the controller 112 judges that the frost has been melted sufficiently and ends the defrosting operation. If Teout≤Tem, the controller 112 judges that the defrosting is insufficient and returns to Step 201 to increase the rotation speed of the second compressor 102.

Whether the evaporator 105 has been defrosted can be judged reliably based on the temperature Teout of the refrigerant at the outlet of the evaporator 105. The temperature Teout can be acquired from the first temperature sensor 106 because it approximately is equal to the temperature of the refrigerant at the inlet of the first compressor 101. An additional temperature sensor may be provided near the outlet of the evaporator 105. After the defrosting operation is ended, the rotation speeds of the first compressor 101 and the second compressor 102 are set to the rated rotation speeds, and a usual hot water supply operation (the flow of the water into the radiator 103) is resumed.

As mentioned above, it is possible to shorten the defrosting time and reduce the power consumption by increasing the rotation speed of the second compressor 102 gradually.

Figure 8:
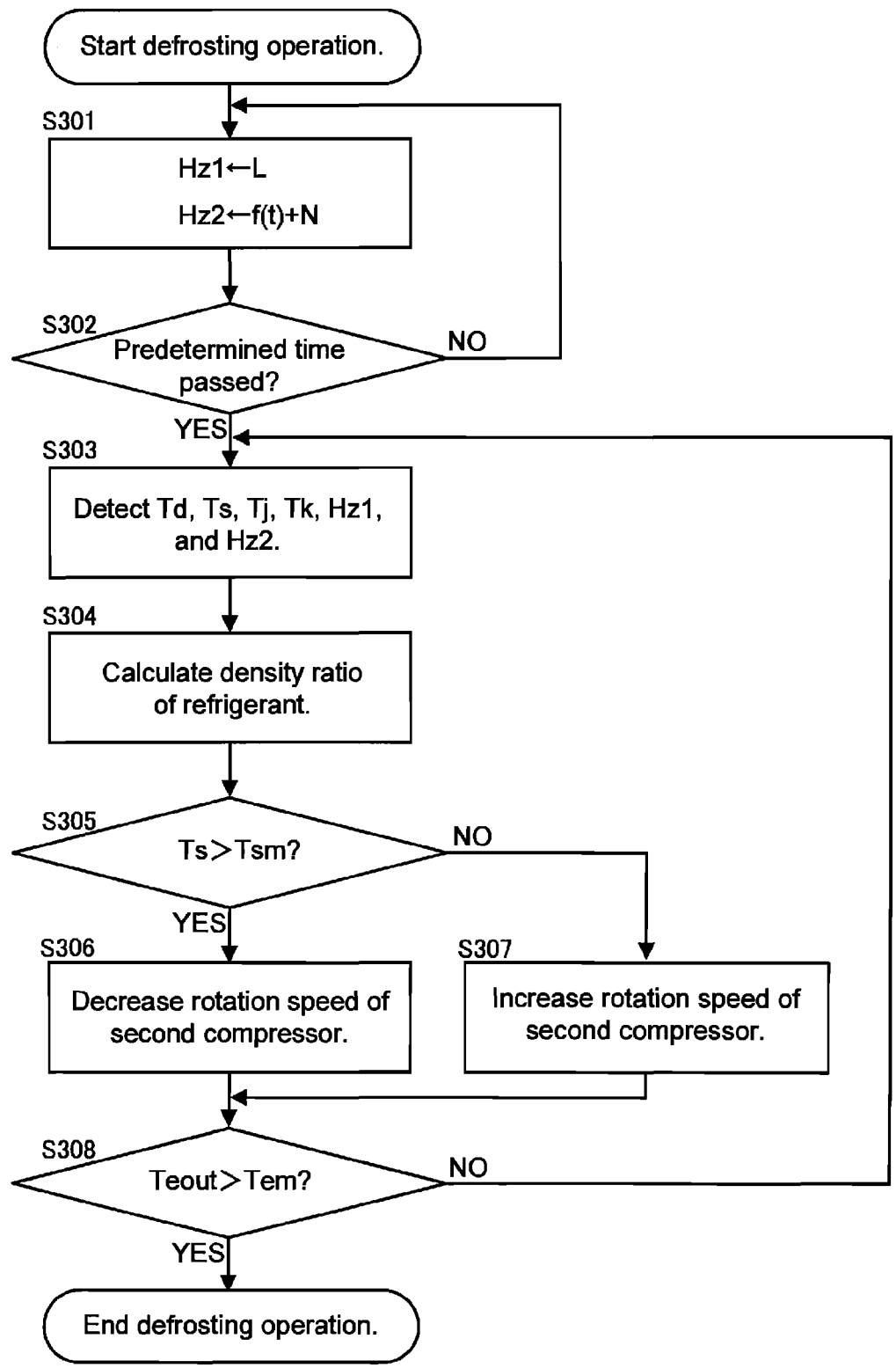
FIG. 8 is another control flow chart of the defrosting operation.
Figure 9:
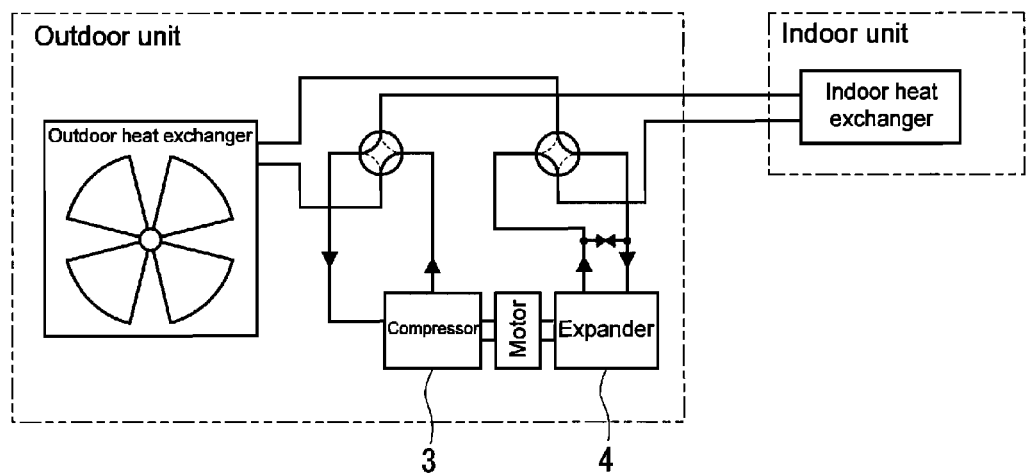
FIG. 9 is a configuration diagram showing a conventional refrigeration cycle apparatus using an expander.
Figure 10:
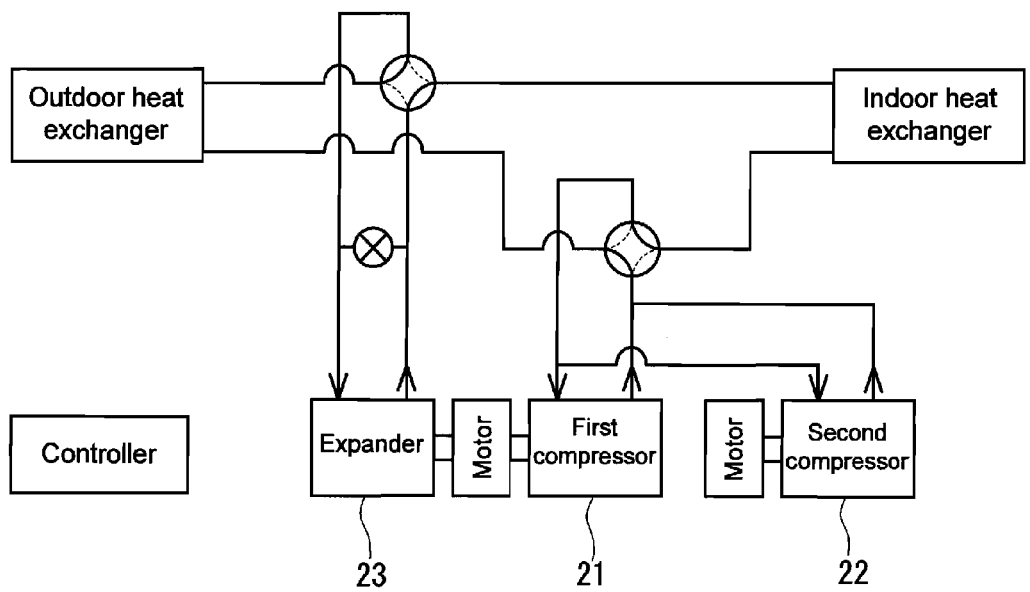
FIG. 10 is a configuration diagram showing another conventional refrigeration cycle apparatus using an expander.
Figure 11:
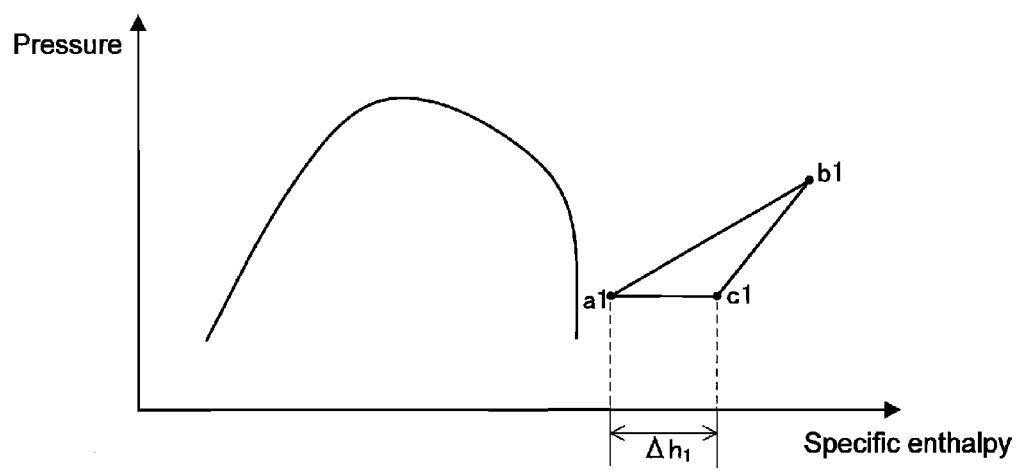
FIG. 11 is a Mollier diagram of the conventional refrigeration cycle apparatus using an expander, during the defrosting operation.
Figure 12:
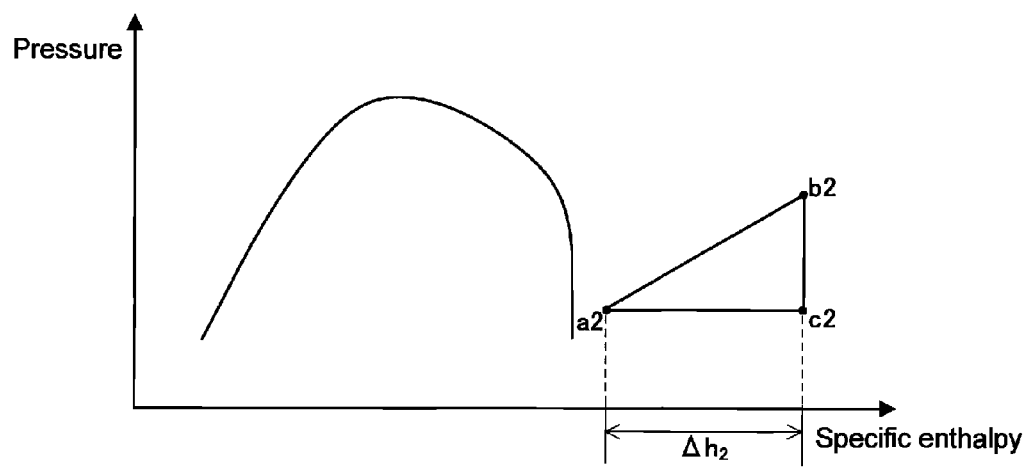
FIG. 12 is a Mollier diagram of a conventional refrigeration cycle apparatus using an expansion valve, during the defrosting operation.

Next, a control further improved from Pattern B shown in FIG. 4 will be described with reference to the control flow chart shown in FIG. 8. The control shown in FIG. 8 can improve further the COP during the defrosting operation and prevent excessive increases in the temperatures of components of the compressors.

First, in Step 301, the rotation speed Hz1 of the first compressor 101 is set to L and the rotation speed Hz2 of the second compressor 102 is set to f(t)+N. This is the same as in Step 201 shown in FIG. 7. Next, in Step 302, a judgment is made whether the defrosting operation has been stabilized. Specifically, a judgment is made whether a predetermined time (5 minutes, for example) has passed since the defrosting was started. If the predetermined time has passed, the sequence proceeds to Step 303. If the predetermined time has not passed, it returns to Step 301. The acceleration of the second compressor 102 may be determined so that the rotation speed Hz2 of the second compressor 102 reaches the rotation speed M within this predetermined time.

Subsequently, in Step 303, temperature Td of the refrigerant at the inlet of the first compressor 101 (a suction temperature of the first compressor 101), temperature Ts of the refrigerant at the outlet of the first compressor 101 (a discharge temperature of the first compressor 101), temperature Tj of the refrigerant at the inlet of the expander 104, temperature Tk of the refrigerant at the outlet of the expander 104, the rotation speed Hz1 of the first compressor 101, and the rotation speed Hz2 of the second compressor 102 are detected. The temperatures Td, Ts, Tj, and Tk can be acquired from the first to fourth temperature sensors 106 to 109, respectively. The rotation speeds Hz1 and Hz2 are data that the controller 112 manages.

Subsequently, the sequence proceeds to Step 304 to calculate the density ratio $(\rho_e/\rho_c)$ of the refrigerant from the detected values mentioned above. The density $\rho_e$ is a density of the refrigerant at the inlet of the first compressor 101, and the density $\rho_e$ is a density of the refrigerant at the inlet of the expander 104. Target discharge temperature Tsm of the first compressor 101 is calculated by using a correlation equation, a numerical data table, etc. saved in the controller 112 in advance, based on the calculated density ratio $(\rho_e/\rho_c)$.

In Step 305, actual discharge temperature Ts is compared with the target discharge temperature Tsm. If Ts>Tsm, the controller 112 judges that the high pressure of the cycle is too high. In this case, the refrigeration cycle tends to balance in such a manner that the density $\rho_e$ of the refrigerant at the inlet of the expander 104 is increased. Thus, the rotation speed of the second compressor 102 is decreased and the flow rate of the refrigerant at the inlet of the expander 104 is lowered in Step 306. Thereby, the discharge temperature Ts of the first compressor 101 and the high pressure of the cycle are decreased.

In contrast, if Td≤Tsm, the controller 112 judges that the high pressure of the cycle is too low. In this case, the refrigeration cycle tends to balance in such a manner that the density $\rho_e$ of the refrigerant at the inlet of the expander 104 is decreased. Thus, the rotation speed of the second compressor 102 is increased and the flow rate of the refrigerant at the inlet of the expander 104 is increased in Step 307. Thereby, the discharge temperature Ts of the first compressor 101 and the high pressure of the cycle are increased.

In Step 308, the temperature Teout of the refrigerant at the outlet of the evaporator 105 is compared with the preset value Tem (10° C., for example). In the present embodiment, the temperature Teout approximately is equal to the suction temperature Td of the first compressor 101. If Teout>Tem, the controller 112 judges that the frost has been melted sufficiently and ends the defrosting operation. If Teout≤Tem, the controller 112 judges that the defrosting is insufficient and returns to Step 303.

As mentioned above, the rotation speed of the second compressor 102 is increased gradually during the period from when the defrosting operation is started until the predetermined time passes. After the predetermined time has passed since the defrosting operation was started, the target discharge temperature Tsm of the first compressor 101 is calculated based on the density ratio ($\rho_e/\rho_c$), and the rotation speed of the second compressor 102 is controlled so that the actual discharge temperature Ts approaches the target discharge temperature Tsm. Thereby, a higher COP can be achieved. Moreover, since excessive increases in the temperatures of components of the compressors 101 and 102 can be prevented, the reliability of the refrigeration cycle apparatus 100 is increased.

In the present embodiment, the circulation amount of the refrigerant is increased gradually by increasing the rotation speed of the first compressor 101 and/or the rotation speed of the second compressor 102 gradually. However, there are other methods for increasing gradually the circulation amount of the refrigerant, besides by increasing the rotation speed. For example, it is possible to use a variable displacement compressor as the first compressor 101 and/or the second compressor 102. In this case, the circulation amount of the refrigerant can be increased gradually by performing a control for increasing the displacement gradually instead of increasing the rotation speed gradually. Furthermore, the same results are obtained also when the control for increasing the rotation speed and the control for increasing the displacement are performed in combination.

INDUSTRIAL APPLICABILITY

The refrigeration cycle apparatus of the present invention is applicable to various applications, such as a water heater, an air conditioner, a floor heating system, a bathroom drier, and a snow melting system, in which frost may be formed on an evaporator thereof.

The invention claimed is:
1. A method for operating a refrigeration cycle apparatus during a defrost operation, the apparatus comprising:
   a positive displacement first compressor;
   a positive displacement second compressor whose rotation speed can be controlled independently from a rotation speed of the first compressor, the positive displacement second compressor being provided in parallel with the first compressor in a refrigerant circuit;
   a radiator for cooling a refrigerant compressed by the first and second compressors;
   a positive displacement expander for recovering power while expanding the refrigerant cooled by the radiator;
   an evaporator for evaporating the refrigerant expanded by the expander;
   a rotation shaft connecting the first compressor to the expander so that the first compressor uses the power recovered by the expander; and
   a controller for controlling the flow rate of the refrigerant through the evaporator during the defrost operation, such control comprising the steps of
   (1) operating the first compressor at a first rotation speed and operating the second compressor at a second rotation speed at the beginning of the defrost operation, wherein one of the first and second rotation speeds is slower than the other;
   (2) comparing the refrigerant temperature at the outlet of the evaporator with a preset temperature; and
   (3)
   (a) if the refrigerant temperature at the outlet of the evaporator is lower than the preset temperature, gradually increasing, in a predetermined manner, the rotation speed of the first or second compressor, whichever is operating at the slower speed, to increase the flow rate of refrigerant through the evaporator, or
   (b) if the refrigerant temperature at the outlet of the evaporator is equal to or higher than the preset temperature, terminating the defrost operation.

2. The method for operating the refrigeration cycle apparatus according to claim 1, wherein the rotation speed of at least one selected from the first compressor and the second compressor is increased at a rate of 2 Hz/min to 20 Hz/min after the defrosting operation is started.

3. The method for operating the refrigeration cycle apparatus according to claim 1, wherein the flow rate of the refrigerant is increased by keeping the rotation speed of the first compressor at rotation speed L and increasing continuously or stepwise the rotation speed of the second compressor from rotation speed N that is lower than the rotation speed L after the defrosting operation is started.

4. The method for operating the refrigeration cycle apparatus according to claim 3, wherein the rotation speed L denotes a maximum rotation speed of the first compressor.

5. The method for operating the refrigeration cycle apparatus according to claim 1, wherein the flow rate of the refrigerant is increased by keeping the rotation speed of the second compressor at rotation speed L and increasing continuously or stepwise the rotation speed of the first compressor from rotation speed N that is lower than the rotation speed L after the defrosting operation is started.

6. The method for operating the refrigeration cycle apparatus according to claim 5, wherein the rotation speed L denotes a maximum rotation speed of the second compressor.

7. The method for operating the refrigeration cycle apparatus according to claim 3, the refrigeration cycle apparatus further comprising:
   a first temperature sensor for detecting a temperature of the refrigerant at an inlet of the first compressor;

a second temperature sensor for detecting a temperature of the refrigerant at the outlet of the first compressor;
a third temperature sensor for detecting a temperature of the refrigerant at an inlet of the expander; and
a fourth temperature sensor for detecting a temperature of the refrigerant at an outlet of the expander, wherein:
the rotation speed of the second compressor is increased continuously or stepwise during a period from when the defrosting operation is started until a predetermined time passes; and
the control that the controller executes includes further a step of, after the predetermined time passes, calculating a target discharge temperature for the refrigerant at the outlet of the first compressor that is under the defrosting operation based on detection results from the first temperature sensor, the second temperature sensor, the third temperature sensor, and the fourth temperature sensor, and controlling the rotation speed of the second compressor so that the temperature detected by the second temperature sensor approaches the target discharge temperature.

* * * * *